United States Patent [19]

Kawamura

[11] Patent Number: 5,038,344
[45] Date of Patent: Aug. 6, 1991

[54] FDM-TDM TRANSFORMING DEVICE

[75] Inventor: Yoji Kawamura, Tokyo, Japan

[73] Assignee: NEC Corporation, Tokyo, Japan

[21] Appl. No.: 440,168

[22] Filed: Nov. 22, 1989

[30] Foreign Application Priority Data

Nov. 22, 1988 [JP] Japan .................................. 63-295104

[51] Int. Cl.⁵ ............................................... H04J 1/02
[52] U.S. Cl. ......................................... 370/70; 370/50; 370/97
[58] Field of Search ......................... 370/70, 50, 97, 75

[56] References Cited

U.S. PATENT DOCUMENTS 4,759,013  7/1988  Ichiyoshi ............................... 370/70
4,901,310  2/1990  Ichiyoshi ............................... 370/70

OTHER PUBLICATIONS

T. Kohri et al., "A 400ch SCPC Signal Demodulator Using Chirp Transform and Correlation Detection Scheme", Globecom Tokyo, Nov. 1987, Session 8.

Primary Examiner—Douglas W. Olms
Assistant Examiner—Dang T. Ton
Attorney, Agent, or Firm—Sughrue, Mion, Zinn Macpeak & Seas

[57] ABSTRACT

Received FDM (Frequency Division Multiplex) SCPC (Single Channel Per Carrier) signals are usually converted into intermediate frequency band signals and then transformed into TDM (Time Division Multiplex) signals by an FDM-TDM transforming device which uses a chirp filter. The FDM-TDM transforming device has a chirp signal generating circuit, a mixer for multiplying the FDM SCPC signals by the chirp signal, and a chirp filter which receives outputs of the mixer and feeds out TDM signals. The FDM SCPC signals are frequency-swept by the chirp signal at the mixer and then applied to the chirp filter. The individual FDM frequency-swept signals applied to the chirp filter are outputted after being compressed to time locations each being assigned to a different sweep frequency.

4 Claims, 9 Drawing Sheets

T = 1/B

T = 1/B

T = 1/B

FDM-TDM TRANSFORMING DEVICE

BACKGROUND OF THE INVENTION

The present invention relates to a transforming circuit applicable to SCPC (Single Channel Per Carrier) multiplex communications, radars, spectrum analyzers and so forth and, more particularly, to a FDM (Frequency Division Multiplex)-TDM (Time Division Multiplex) transforming device for converting a FDM signal into a TDM signal by using a chirp filter.

Prior art FDM-TDM transforming devices of the type using a chirp filter are disclosed in, for example, "A 400ch SCPC SIGNAL DEMODULATOR USING CHIRP TRANSFORM AND CORRELATION DETECTION SCHEME", GLOBECOM TOKYO, November 1987, Session 8, MODULATION CODING FOR SATELLITE COMMUNICATIONS as well as in U.S. Pat. No. 4,759,013 assigned to the applicant of the present invention. In any of the prior art FDM-TDM transforming devices, FDM SCPC signals are swept in frequency by a chirp signal (local frequency-sweeping signal whose frequency varies with the lapse of time) and then fed to a chirp filter. The individual frequency-swept FDM signals applied to the chirp filter are compressed to time locations each being allocated to a different sweeping frequency and then fed out, i.e., the FDM SCPC signals are transformed into TDM signal.

The prior art FDM-TDM transforming devices described above are successful so long as the modulation system imposes no limitations on individual FDM SCPC signals as to frequency band on the frequency axis. However, when it comes to a communication system wherein the frequency band is limited on the frequency axis and intersymbol interference occurs on the time axis, the prior devices allow the integrated value of interference waveform (interference energy) to directly translate into an amount of signal deterioration. Should the FDM frequency interval be not equal to a signal modulation rate multiplied by a natural number, the interference of nearby channels would become critically great.

SUMMARY OF THE INVENTION

It is therefore an object of the present invention to provide an FDM-TDM transforming device applicable even to a communication system which involves intersymbol interference on the time axis and a communication system in which the FDM frequency interval is not equal to a signal modulation rate multiplied by a natural number.

An FDM-TDM transforming device of the present invention comprises a chirp signal generating means for generating a chirp signal which is a local frequency sweeping signal whose frequency changes with time, amplitude modulator means, mixer means for multiplying the amplitude-modulated chirp signal and FDM SCPC signals, chirp filter means for compressing the output of said mixer means on a time axis.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
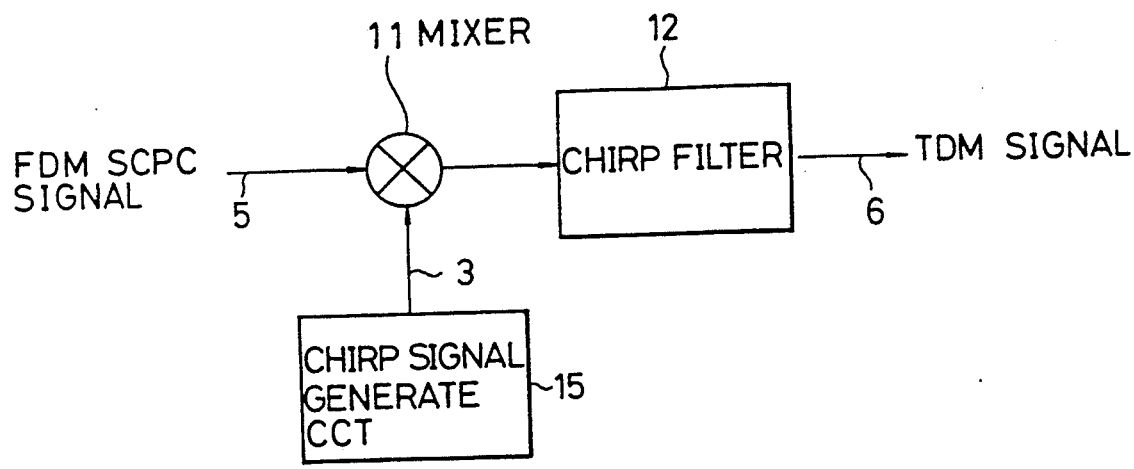
FIG. 1 is schematic block diagram showing a prior art FDM-TDM transforming device.
Figure 2:
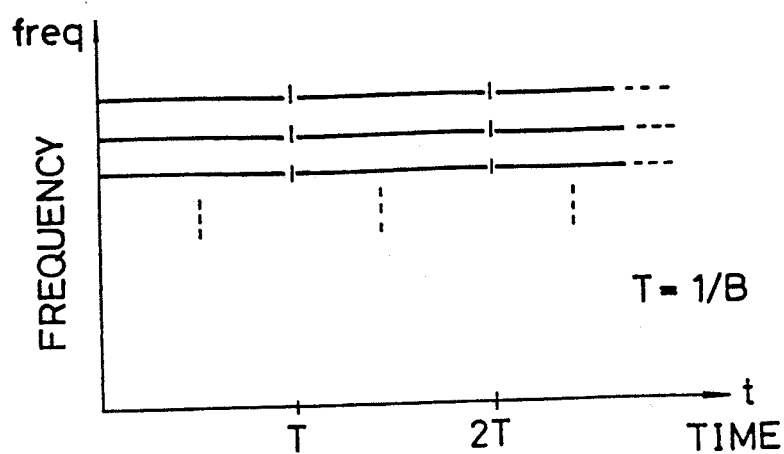
FIG. 2 is a graph showing an FDM SCPC signal which is free from limitations as to frequency band.
Figure 3:
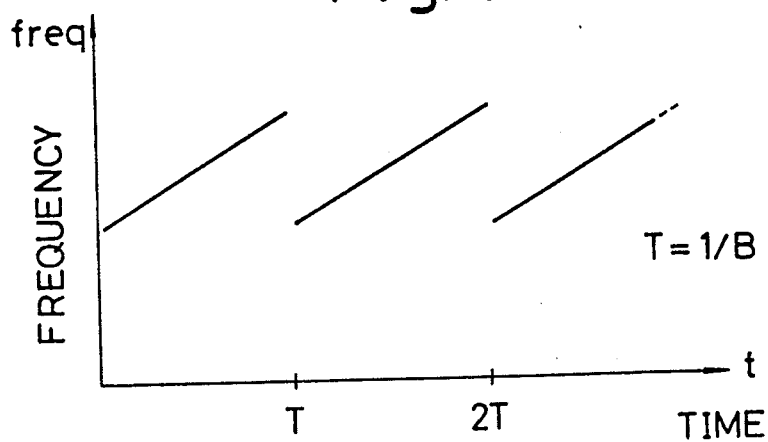
FIG. 3 is a graph showing a chirp signal with no amplitude modulation.
Figure 4:
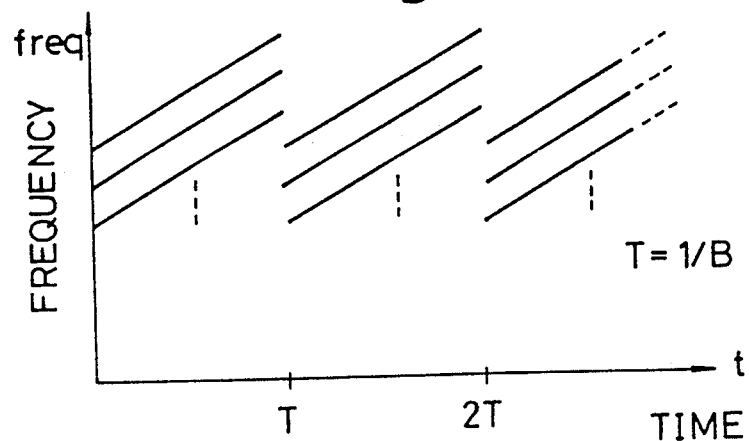
FIG. 4 is a graph showing a frequency-swept FDM SCPC signal.
Figure 5:
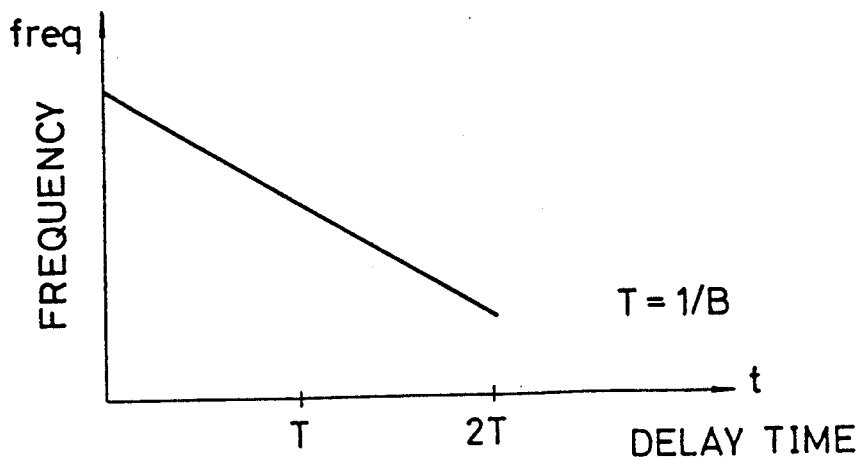
FIG. 5 is a graph representative of a delay characteristic of a chirp filter shown in FIG. 1.
Figure 6:
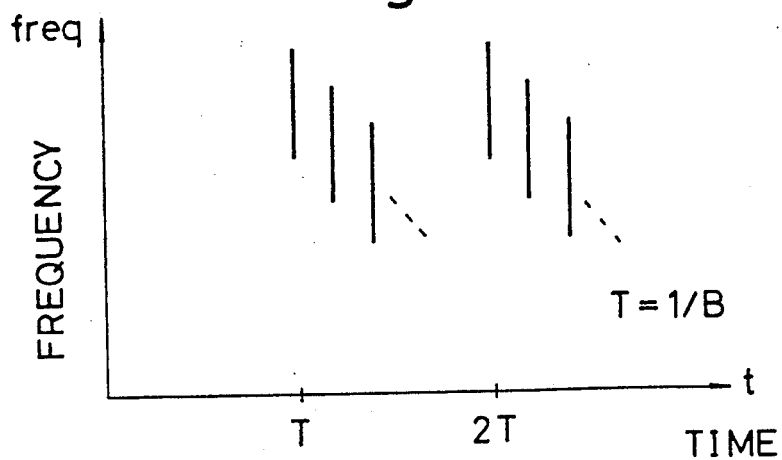
FIG. 6 is a graph showing TDM signal which is the output of the chirp filter of FIG. 1.

To better understand the present invention, prior art FDM-TDM transforming devices will be described in detail with reference to FIGS. 1 to 8. The prior art FDM-TDM transforming device shown in FIG. 1 has a mixer 11, a chirp filter 12, and a chirp signal generating circuit 15. An FDM SCPC signal 5 is applied to the mixer 11 and has frequencies as shown in FIG. 2. A chirp signal 3 is fed from the chirp signal generating circuit 15 to the mixer 11 and varies in frequency with the lapse of time, as shown in FIG. 3. The mixer 11 sweeps the FDM SCPC signal by the chirp signal 3 with respect to frequency, as shown in FIG. 4. The output signal of the mixer 11 is delivered to the chirp filter 12. Having a frequency characteristic as shown in FIG. 5, the chirp filter 12 comprises the FDM frequency-swept signal to time locations allocated to the individual sweeping frequencies and feeds out the compressed signals. For details, a reference may be made to the previously mentioned U.S. Pat. No. 4,759,013. The device of FIG. 1, therefore, converts the FDM SCPC signal into a TDM signal 6 which is indicated in FIG. 6.

Figure 7:
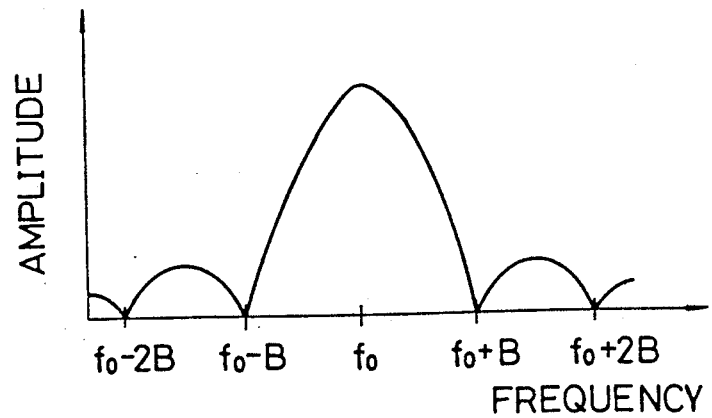
FIG. 7 shows a frequency spectrum of SCPC signals which are not limited as to frequency band.

The individual FDM SCPC signals are free from limitations as to frequency band on frequency axis, and it is a common practice to adopt a modulation system which reduces intersymbol interference to zero. As shown in FIG. 7, assuming that the modulation rate is B (bps), the frequency spectrum of SCPC signals spreads as $\sin(\pi f/B)/(\pi f/B)$. Hence, the frequency interval for FDM is selected to be $N \times B$ (Hz) where N is a natural number. Since the intersymbol interference on the time axis is zero, the chirp signal for multiplying FDM SCPC signals at the time of FDM-TDM transform has a constant amplitude.

Figure 8:
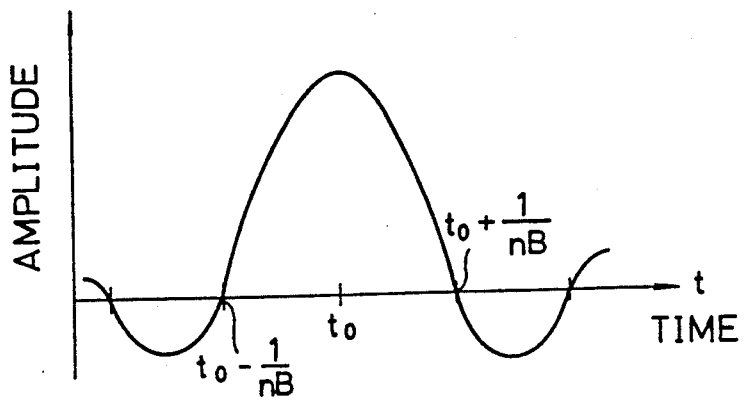
FIG. 8 shows a waveform of the TDM signal of FIG. 6 in the base band with respect to time.

In the above-described type of FDM-TDM transforming device, a TDM signal transformed to the base band has a waveform which is shown in FIG. 8 and expressed as $\sin(\omega t)/(\omega t)$. Generally, FDM-TDM transform is executed such that $\sin(\pi n Bt)/\pi n Bt$ holds. An arrangement is so made as to transform SCPC signals which have undergone FDM at the frequency interval of $N \times B$ (Hz), to the zero point of the time waveform shown in FIG. 8, whereby the intersymbol interference is ideally zero.

An FDM-TDM transforming device of the present invention will be described with reference to FIGS. 9 to 19 in detail by taking as an example a case wherein the frequency band is limited on frequency axis and intersymbol interference exists on time axis or a case wherein the FDM frequency interval is not equal to the signal modulation rate multiplied by a natural number.

Figure 9:
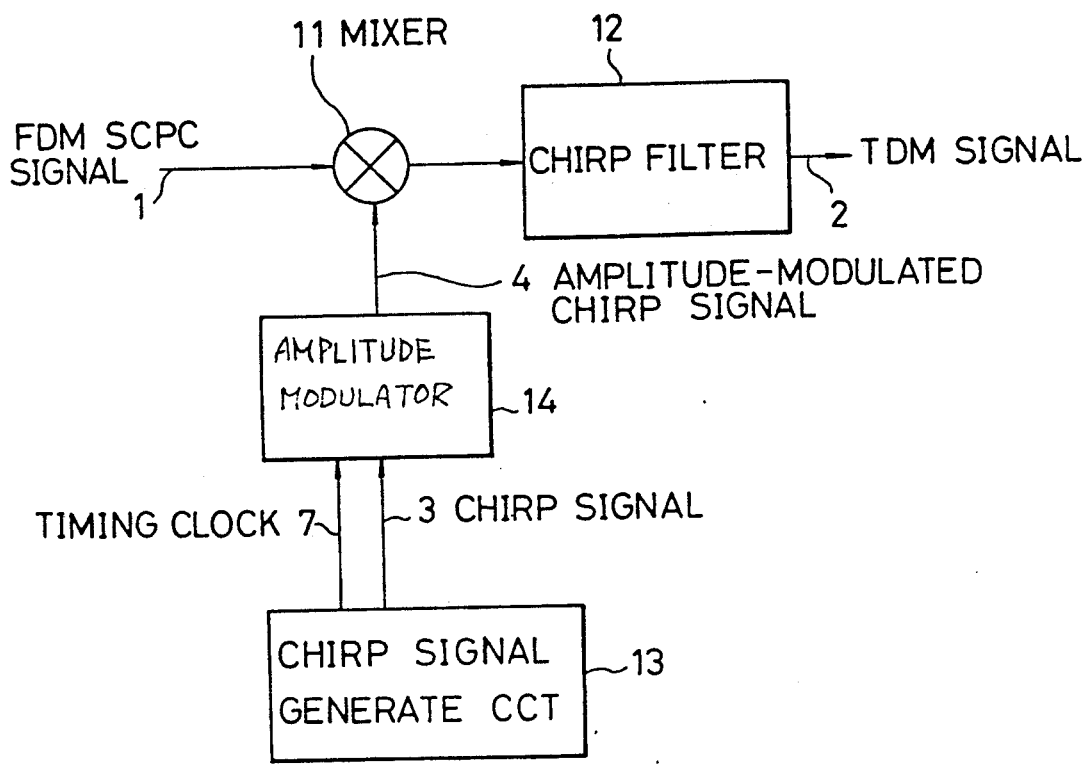
FIG. 9 is a schematic block diagram of an FDM-TDM transforming device embodying the present invention.
Figure 10:
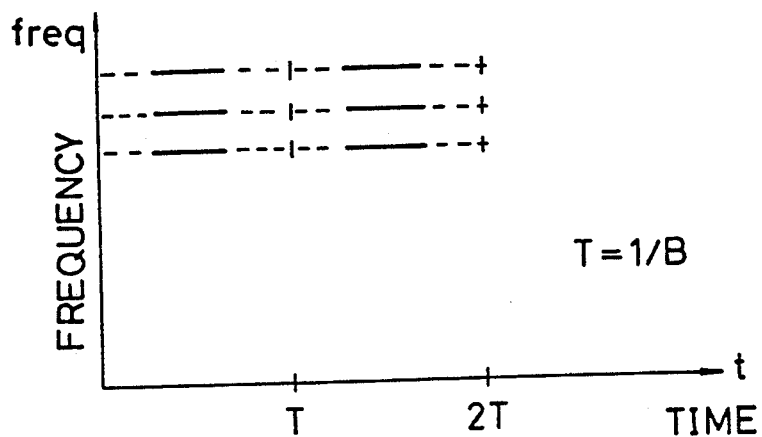
FIG. 10 is a graph showing an FDM SCPC signal limited as to frequency band.
Figure 11:
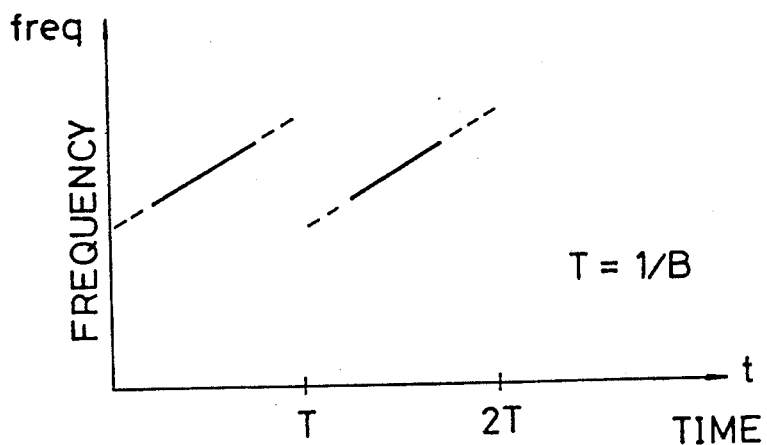
FIG. 11 is a graph showing a chirp signal with amplitude modulation.

Referring to FIG. 9, an FDM-TDM transforming device embodying the present invention has a mixer 11, a chirp filter 12, a chirp signal generating circuit 13, and an amplitude modulator 14. FDM SCPC signals shown in FIG. 10 are applied to the mixer 11, while a chirp signal 4 shown in FIG. 11 is also fed to the mixer 11 from the chirp signal generating circuit 13 via the amplitude modulator 14. The mixer 11 frequency-sweeps the FDM SCPC signals by the chirp signal 4 which has been amplitude-modulated with respect to time. The output signals of the mixer 11 are delivered to the chirp filter 12 which has a delay characteristic as shown in FIG. 5. The chirp filter 12 compresses the input signals at time locations allocated to the individual sweep frequencies and feeds out the resulting signals as TDM signals. In this instance, the FDM SCPC signals have been limited in frequency band on frequency axis and involve intersymbol interference on time axis. In FIG. 10, solid lines and phantom lines are representative of the portions where intersymbol interference is not noticeable and the portions where it is noticeable, respectively. Concerning the chirp signal 4 which has undergone amplitude modulation with time, the solid line portions and the phantom line portions shown in FIG. 11 indicate portions where the amplitude is large and the portions where it is small, respectively.

Figure 12:
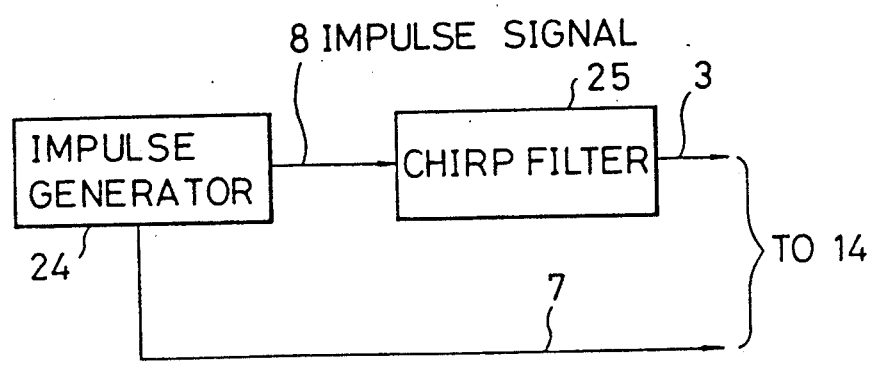
FIG. 12 is a schematic block diagram showing a specific construction of a chirp signal generating circuit of FIG 9.
Figure 13:
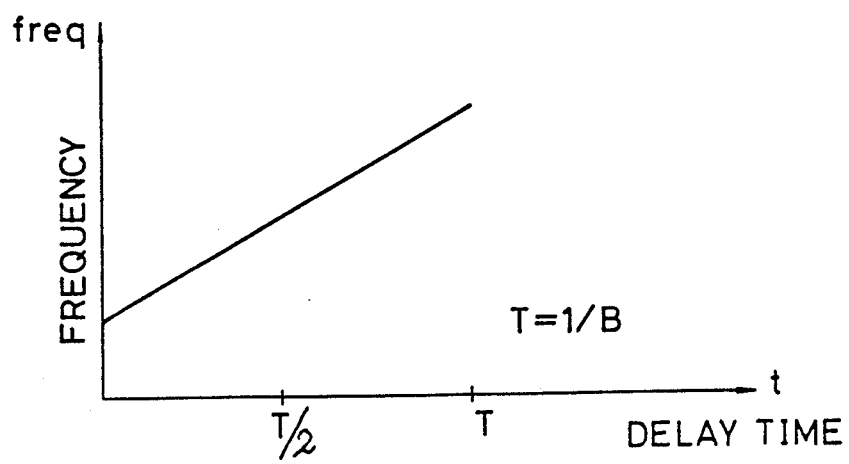
FIG. 13 is a graph representative of a delay characteristic of a chirp filter shown in FIG. 12.
Figure 14:
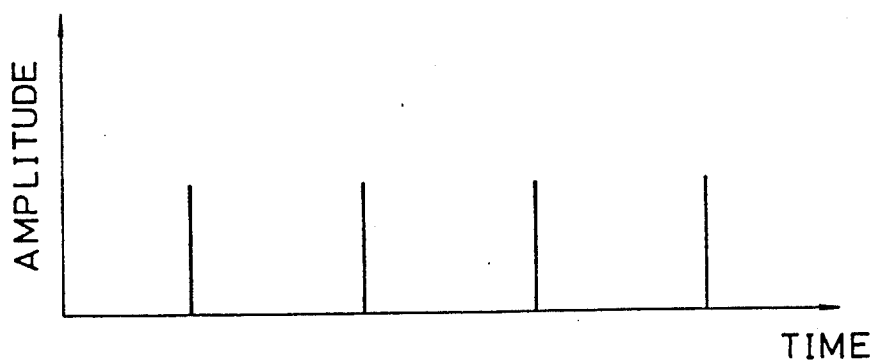
FIG. 14 shows the waveform of an impulse signal which is outputted by an impulse generator of FIG. 12.
Figure 15:
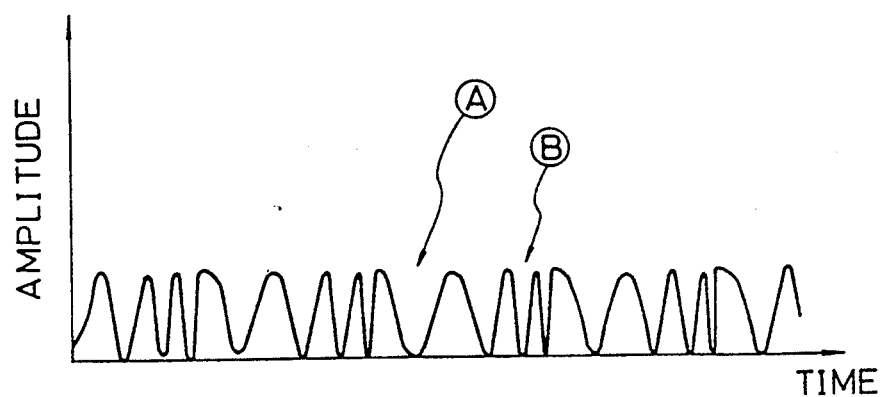
FIG. 15 is a graph showing a chirp signal outputted by the chirp filter of FIG. 12.

Referring to FIG. 12, a specific construction of the chirp signal generating circuit 13 is shown in a schematic block diagram. As shown, the circuit 13 is made up of an impulse generator 24 and a chirp filter 25. The impulse generator 24 generates an impulse signal 8 (signal having an amplitude within an extremely short period of time only) and a timing clock 7, while the chirp filter 25 transforms the impulse signal 8 into the chirp signal 3 and has a delay characteristic as shown in FIG. 13. The impulse signal 8 which is shown in FIG. 14 is applied to the chirp filter 25 to become the chirp signal 3 the frequency of which varies with time, as shown in FIG. 15. In FIG. 15, labels A and B indicate paints at which the frequency is low and high, respectively.

Figure 16:
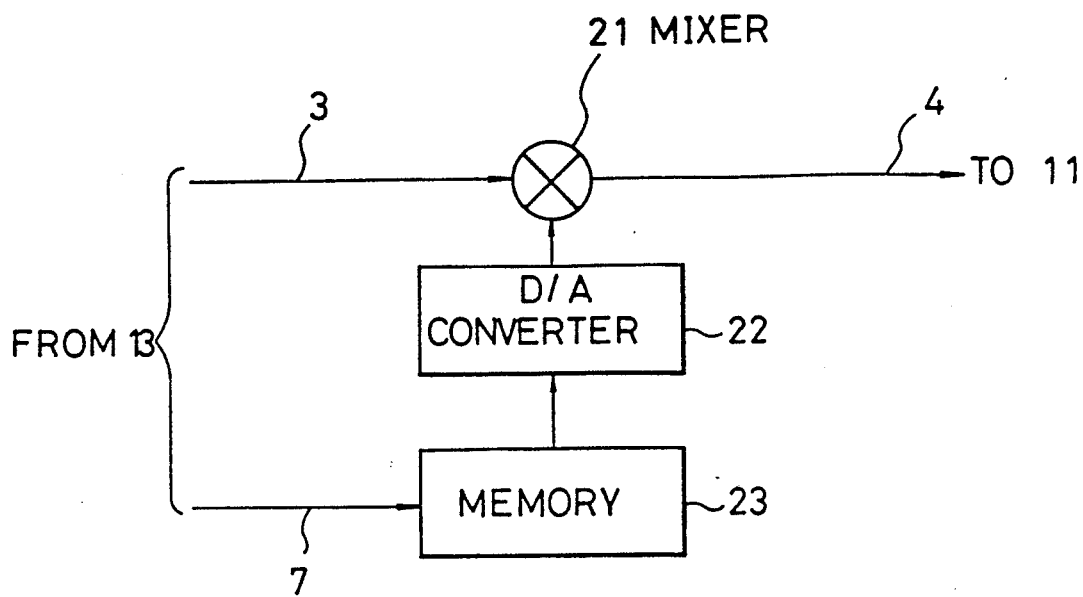
FIG. 16 is a block diagram showing a specific construction of an amplitude modulator of FIG. 9.
Figure 17:
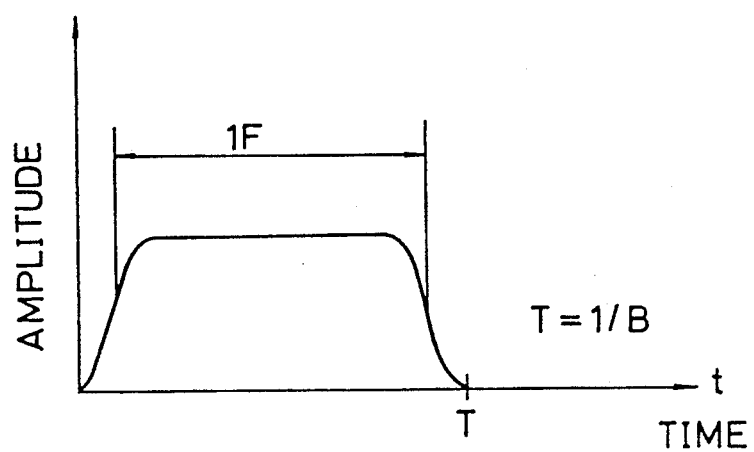
FIG. 17 is a graph representative of the amplitude characteristic of a signal which is produced by multiplying an FDM SCPC signal by amplitude-modulated chirp signal.
Figure 18:
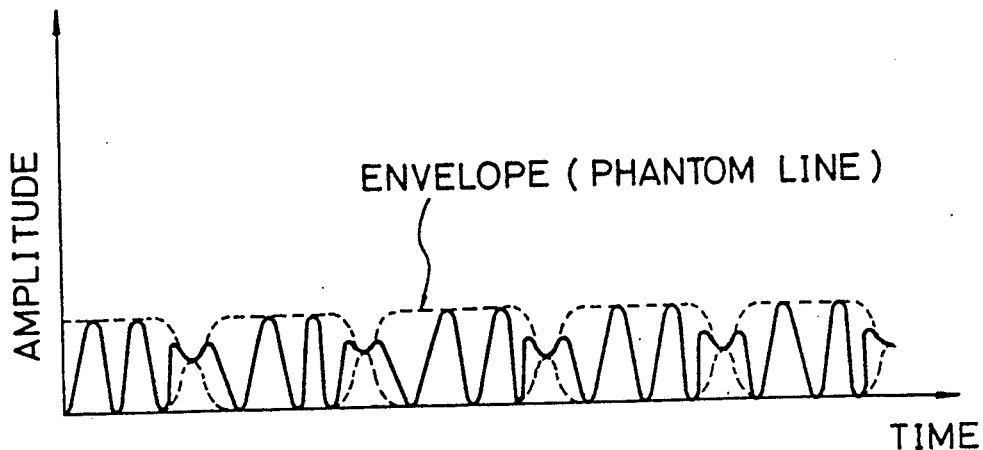
FIG. 18 shows an amplitude waveform of an amplitude-modulated chirp signal.

FIG. 16 shows a specific construction of the amplitude modulator 14. As shown, the circuit 14 has a memory 23, a digital-to-analog (DA) converter 22, and a mixer 21. The memory 23 stores one period of the amplitude waveform of FIG. 18 (the Phantomline) of time axis in the form of a digital signal such that signals produced by multiplying the FDM SCPC signals by the amplitude-modulated chirp signal have an envelope as shown in FIG. 17. The digital output of the memory 23 is fed to the DA converter 22 to be converted into an analog signal. The mixer 21 mixes the amplitude waveform from the DA converter and the chirp signal 3. The amplitude waveform (one Period of the Phantom line of FIG. 18) of time axis is read out of the memory 23 in response to the timing clock 7 being generated by the chirp signal generator 13. The DA converter 22 transforms the amplitude waveform, or digital signal, into an analog signal. The mixer 21 multiplies the analog signal by the chirp signal 3 and thereby produces the chirp signal 4 which has undergone amplitude modulation, as shown in FIG. 18. In FIG. 18, the phantom line is representative of the envelope (i.e. the amplitude characteristic of FIG. 17 repeated once per timing clock 7 signal).

In frequency-sweeping FDM SCP signals, the FDM-TDM transforming device having the above construction multiplies the portions with unnoticeable intersymbol interference (solid line portions in FIG. 10) by the portions of the chirp signal having large amplitudes the transforming device also multiplies the portions with noticeable intersymbol interference (phantom line portions in FIG. 11) by the portions of the chirp signal having small amplitudes. This is successful in allowing a minimum of intersymbol interference to occur.

Figure 19:
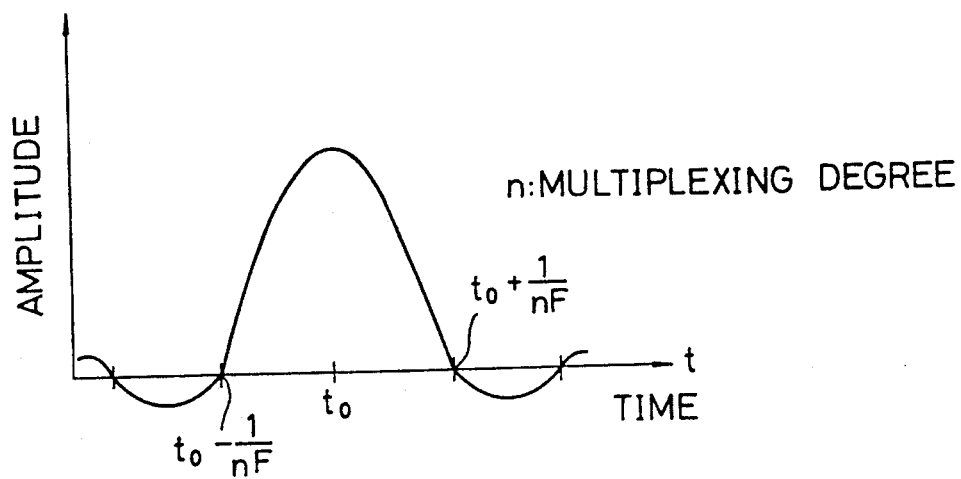
FIG. 19 shows a waveform of a TDM signal in the base band with respect to time which is outputted by the chirp filter of FIG. 1.

When the chirp signal 4 is amplitude-modulated such that the envelope of the signals produced by multiplying the FDM SCPC signals 1 by the chirp signal 4 has the amplitude characteristic shown in FIG. 17, the TDM signal of the base band undergone FDM-TDM transform will have a waveform shown in FIG. 19. Hence, interchannel interference is eliminated even if the frequency interval F (Hz) is not equal to the modulation rate B (bps) multiplied by a natural number.

Figure 20A:
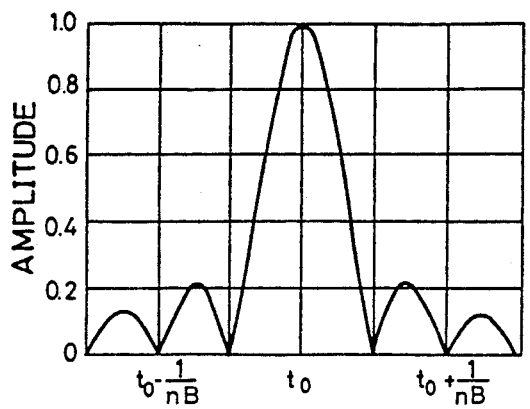
FIGS. 20(a) to 20(c) show signal waveforms heretofore observed when intersymbol interference exists.
Figure 20B:
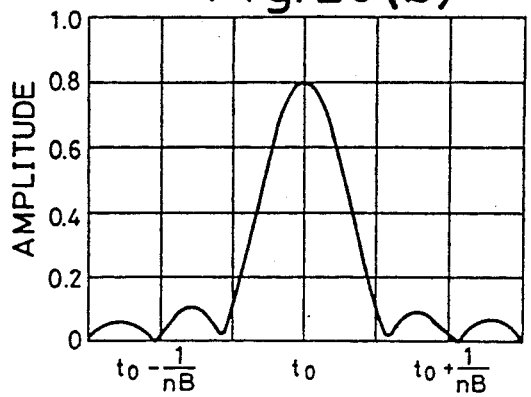
Figure 20C:
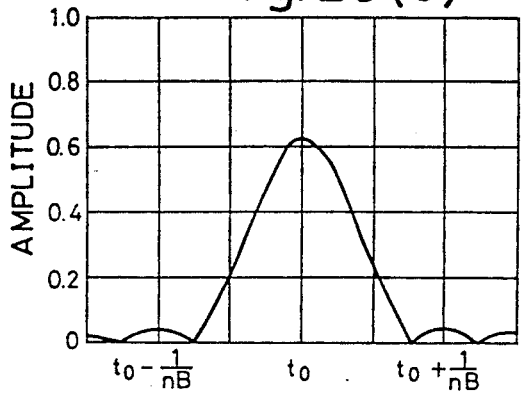

FIGS. 20(a) to 20(c) show signal waveforms of TDM signals in the base band which the prior art FDM-TDM transforming devices produce when intersymbol interference exists. specifically, FIG. 20(a) shows a waveform appearing when the preceding and succeeding signals share the same phase (symbol). FIG. 20(b) shows an average waveform. Further FIG. 20(c) shows a waveform appearing when the preceding and succeeding signal are opposite in phase (symbol) to each other.

Figure 21A:
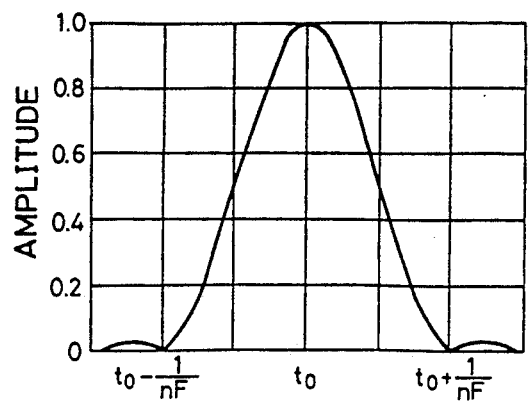
FIGS. 21(a) to 21(c) show signal waveforms whose intersymbol interference has been reduced by the illustrative embodiment of the present invention.
Figure 21B:
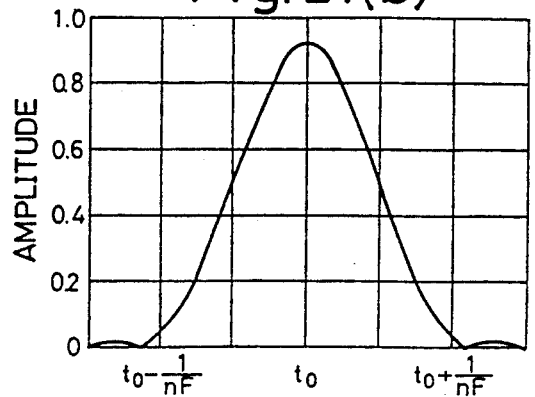
Figure 21C:
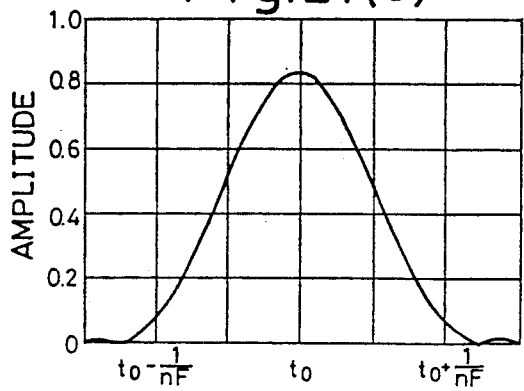

FIGS. 21(a) to 21(c) show specific signal waveforms particular to the FDM-TDM transforming device of the present invention which reduces intersymbol interference. Specifically, FIG. 21(a) shows a signal waveform appearing when the preceding and succeeding symbols are the same in phase, FIG. 21(b) shows an average signal waveform, and FIG. 21(c) shows a signal appearing when the preceding and succeeding symbols are opposite in phase.

The illustrative embodiment shown and described is less effected by intersymbol interference than the prior art. Concerning the average signal waveform, the amplitude peak attainable with the illustrative embodiment is 0.92 (amplitude peak shown in FIG. 21(b)) which is contrastive to 0.82 particular to the prior art (amplitude peak shown in FIG. 20(b)). More specifically, while the prior art suffers from signal amplitude deterioration due to intersymbol interference which amounts to 1.73 dB (20 log [0.82/1.0.]), the present invention reduces it to 0.73 dB (20 log [0.92/1.0.]) which means an improvement over the prior art by 1.0 dB.

In frequency-sweeping FDM-SCPC signals, the illustrative embodiment multiplies their portions where intersymbol interference is not noticeable by the portions of the chirp signal having large amplitude and multiples the portions where it is noticeable by the portions of the chirp signal having small amplitude, thereby reducing intersymbol interference. Further, by amplitude-modulating the chirp signal such that the product of the SCPC signal and chirp signal has a certain amplitude characteristic (FIG. 19), it is possible to eliminate intersymbol interference even if the frequency interval F (Hz) is not the same as the modulation rate B (bps) multiplied by a natural number.

In summary, it will be seen that the present invention provides an FDM-TDM transforming device which reduces intersymbol interference by amplitude-modulating a chirp signal with respect to time. Further, the present invention is applicable even to a communication system whose frequency interval is not equal to a modulation rate multiplied by a natural number and, therefore, to a wider range of communication systems than the prior art.

Various modifications will become possible for those skilled in the art after receiving the teachings of the present disclosure without departing from the scope thereof.

What is claimed is:

1. An FDM-TDM transforming device, comprising:
   chirp signal generating means for generating a chirp signal which is a local frequency sweeping signal whose frequency changes with time;
   amplitude modulator means coupled to the chirp signal generating means for transforming the chirp signal into an amplitude modulated chirp signal;
   mixer means for multiplying the amplitude-modulated chirp signal and FDM SCPC signals;
   first chirp filter means for compressing the output of said mixer means on a time axis.

2. A device as claimed in claim 1, wherein said mixer means multiplies portions of the FDM SCPC signals having unnoticeable intersymbol interference and portions having noticeable intersymbol interference by portions of the amplitude-modulated chirp signal having large amplitude and portions having small amplitude, respectively.

3. A device as claimed in claim 1, wherein said chirp signal generating means comprises:
   means for generating an impulse signal and a timing clock signal; and
   second chirp filter means for transforming the impulse signal into the chirp signal.

4. A device as claimed in claim 1, wherein said amplitude modulator means comprises:
   memory means for storing a digital signal representative of an amplitude waveform and for generating the digital signal in response to a timing clock signal generated by said chirp signal generating means;
   a DA converter means for converting the digital signal into an analog signal; and
   means for multiplying the analog signal and the FDM SCPC signals.

* * * * *